United States Patent [19]
Bosnjak

[11] 3,951,818
[45] Apr. 20, 1976

[54] CHEVRON CLARIFIER

[76] Inventor: Milovan Bosnjak, 6322 S. Poplar Court, Englewood, Colo. 80110

[22] Filed: Dec. 9, 1974

[21] Appl. No.: 530,821

[52] U.S. Cl. .............................................. 210/522
[51] Int. Cl.² ........................................ B01D 21/00
[58] Field of Search .................... 210/83, 521, 522

[56] References Cited
UNITED STATES PATENTS

| | | | |
|---|---|---|---|
| 653,012 | 7/1900 | Koyl | 210/521 |
| 1,156,276 | 10/1915 | Darrow | 210/522 |
| 1,648,607 | 11/1927 | Brown | 210/522 X |
| 1,709,971 | 4/1929 | Coe | 210/521 |
| 2,314,977 | 3/1943 | Green | 210/522 |
| 3,718,257 | 2/1973 | Bach | 210/521 |
| 3,754,656 | 8/1973 | Horiguchi | 210/521 |
| 3,837,501 | 9/1974 | Pielltenroid | 210/522 |

Primary Examiner—Theodore A. Granger
Attorney, Agent, or Firm—Max L. Wymore

[57] ABSTRACT

This clarifier comprises a plurality of separation elements stacked within a vessel in vertical columns so as to provide a plurality of single stage separation elements for clarifying or separating a substance of heavier density from a liquid having a lesser density. Each of the separation elements provides a uniform cross section in the direction of fluid flow dependent upon factors such as the particular characteristics of the heavier-density substance and the liquid, the height of the particular separation element in the vertical column, and the desired clarity of the liquid flowing from the clarifier. Each separation element includes a predetermined number of separation apertures having predetermined cross sectional areas. Each separation element has two portions joined at an angle and the separation elements are retained in pairs of vertical columns in a manner so as to suggest a chevron-like pattern, with a clarified liquid flow path through the center of the pair of columns.

12 Claims, 6 Drawing Figures

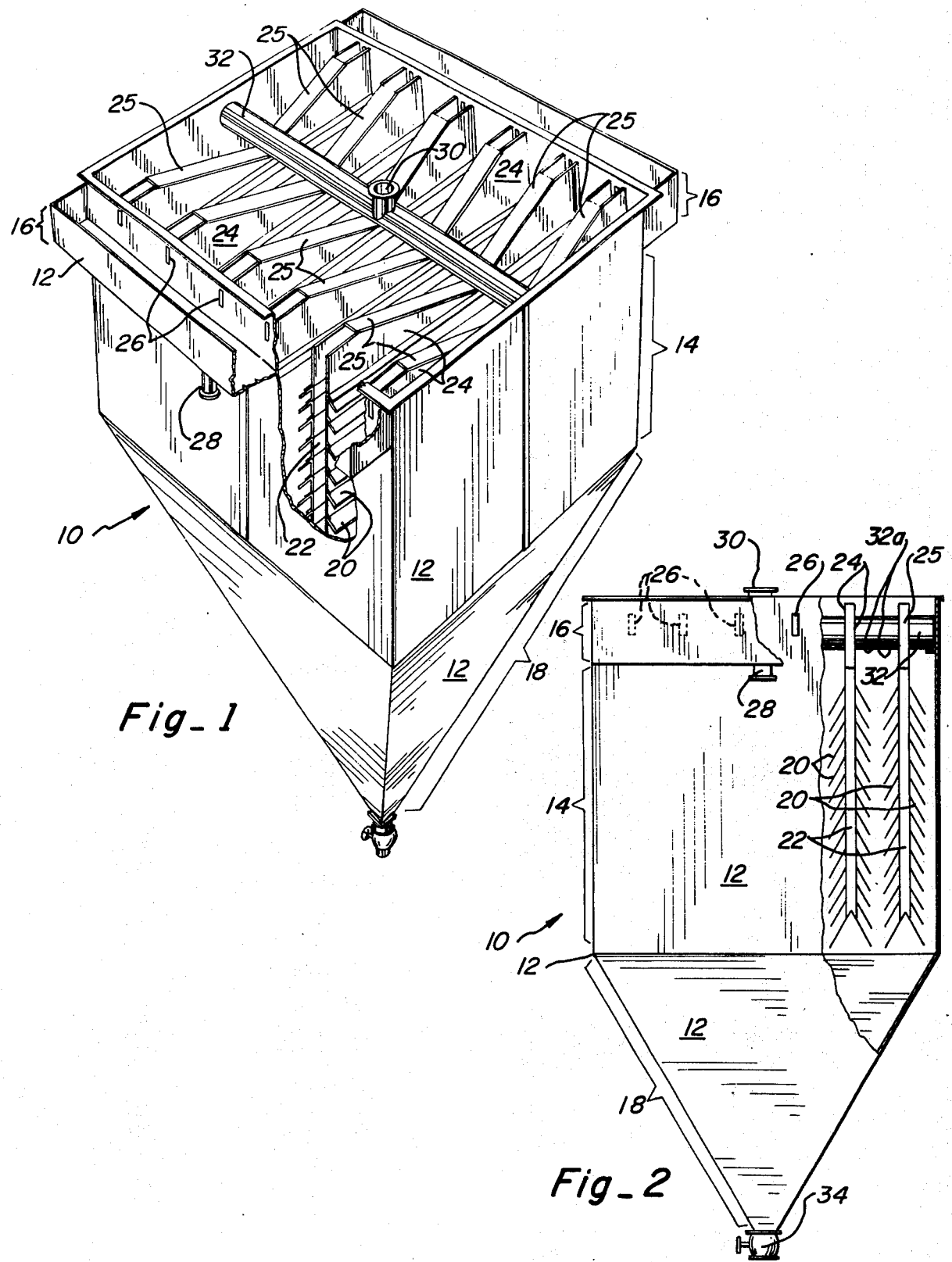
Fig_1
Fig_2

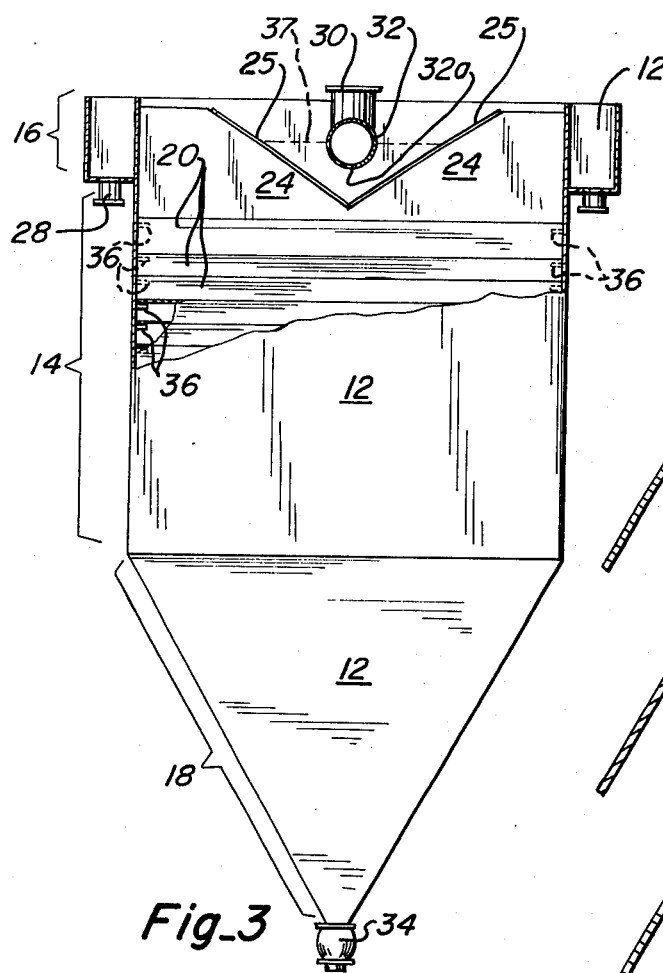
Fig_3
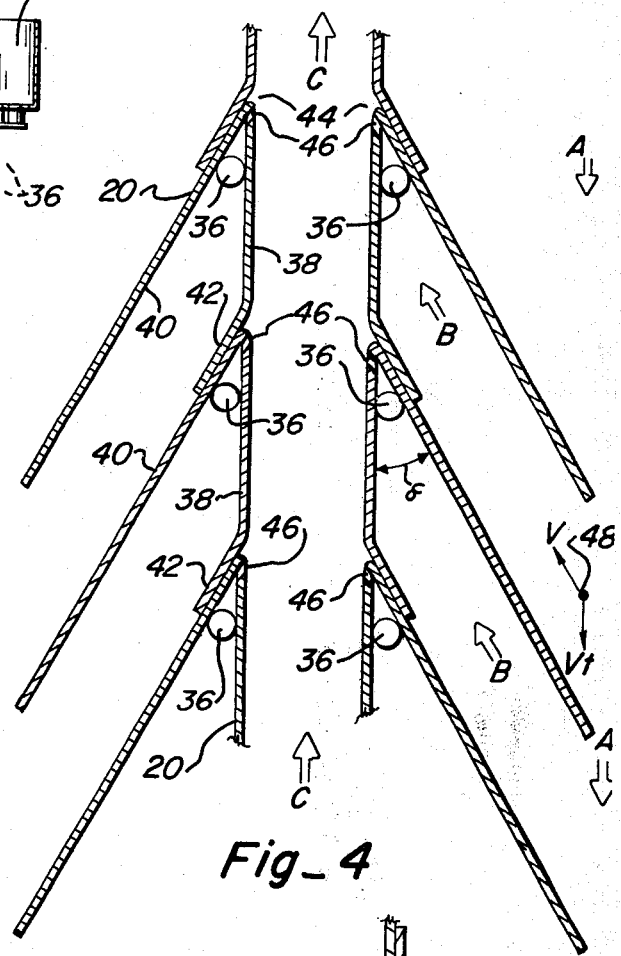
Fig_4
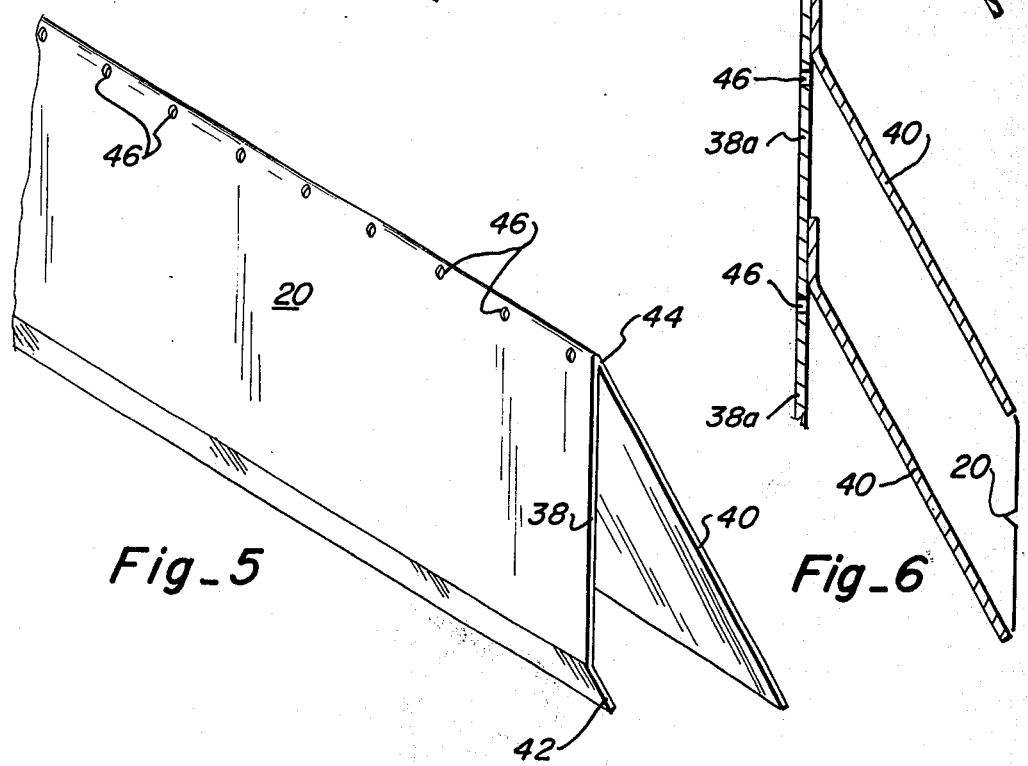
Fig_5
Fig_6

CHEVRON CLARIFIER

BACKGROUND AND SUMMARY OF THE INVENTION

This invention relates to liquid purification or separation apparatus, and more particularly, to such apparatus of the gravity separation type.

Apparatus that separates a substance of heavier density from a liquid having a lesser density are known as clarifiers. Clarifiers have wide utility and application and, in general, are of the same utility as filters, centrifugal separators, devices employing reverse osmosis principles, and gravity-operative filtering apparatus. Clarifiers are used to considerable extent in the sugar refining industry, particularly in beet sugar refineries. Clarifiers are used for clarifying carbonation juices, and for recycling water used in washing sugar beets or sugarcane to remove dirt or other foreign substances from the exterior of these agricultural products before processing.

Due to requirements of the sugar refining industry and other industries, clarifiers should incorporate a number of desirable features. First of all, the clarifier should have no moving parts, so as to secure reliable operation and provide low cost. The clarifier should be of simple construction and should allow easy access to the interior of the apparatus for cleaning the separation elements. The clarifier should occupy a small amount of physical volume to conserve space, but should provide an extremely large amount of settling surface to insure a rapid and efficient separation of the liquid from the substance of heavier density. The clarifier should provide a relatively short retention time during which the separation process occurs, consonant with the desired volume of clarified liquid necessary for particular applications.

Known prior art clarifiers have failed to achieve these characteristics, or have achieved a few of these characteristics at the sacrifice of others. For example, clarifiers employing a series of cone-like filter elements stacked in vertical columns to produce cone trees are known in the art, but this type of clarifier fails to provide high quality separation due to the non-uniform cross section of each of the cone-like filter elements. As the clarified liquid flows upward inside the cone element, the fluid flow rate increases due to the decreasing cross section of the cone element, causing some of the substance of heavier density to be carried along in the fluid flow and forced through the cone-like filter. In addition, such cone tree clarifiers are extremely difficult to clean and are very expensive to construct because of the involved design of each cone-like filter element. Another form of clarifier also known in the art which does employ a uniform cross section in the fluid flow path is a multi-stage device employing a vertical arrangement of zigzag plates. In this particular design, the clarified liquid and the material of heavier density must pass through the same filtering apertures or through the same flow channels. Because the clarified liquid and the substance of heavier density are flowing at opposite directions, a turbulence results causing a disruption of the gravity settling process which reduces the efficiency of separation, and because of the multi-stage operation, increases the retention time. Accordingly, it is an object of this invention to provide a clarifier which avoids known deficiencies of prior art clarifiers and achieves the advantageous characteristics desired in most clarifier applications.

It is an object of this invention to provide a clarifier for separating a substance of heavier density from a liquid of lesser density.

It is another object of this invention to provide a clarifier of the gravity separation type in which a relatively short retention time is required to obtain a large volume of clarified liquid.

It is another object of the invention to provide a clarifier of relatively low cost having a simple construction which allows easy cleaning of and access to the separation elements.

It is a further object of this invention to provide a clarifier of the gravity separation type which requires a relatively small volume to provide a large amount of settling surface to achieve rapid and highly efficient separation.

It is a further object of this invention to provide a clarifier of the gravity separation type in which a steady and laminar flow of clarified liquid is provided at each separation element.

It is still a further object of this invention to provide a clarifier of the gravity separation type which separates the liquid and the substance of heavier density in a manner so as to avoid remixing or turbulence.

To achieve these and other objects, the clarifier of the present invention provides a vessel having a separation portion within which a plurality of separation elements are retained in at least one pair of vertical columns. Each separation element has a uniform cross section in the direction of fluid flow which is achieved by the construction of the separation element. Each separation element generally has a vertically downward extending portion or wing and a downward and outward wing joined at an apex at a predetermined angle. Both wings are generally rectangular in shape. A predetermined number of separation apertures, each of a predetermined cross sectional area are provided near the apex. Each pair of vertical columns of separation elements is arranged such that the downward wings or portion provide a vertically extending collecting channel through which the clarified liquid will flow. As the substance of heavier density settles toward the bottom of the vessel, a gradient of specific gravity is established between the top and the bottom of the vessel, with the top having a lesser specific gravity while the bottom having the greater specific gravity. As the substance of heavier density settles the specific gravity gradient causes a buoyant or generally upward flow of the liquid as its specific gravity decreases as the substance of heavier density settles. The upward-flowing liquid encounters the downward and outward wings of the separation filter elements and the buoyancy forces the liquid toward the separation apertures to the collecting channel. The separation apertures restrict the flow into the collecting channel to a slow laminar flow to insure that the particles of the substance of heavier density will settle downward against the similar outward and downward jutting wings of the separation element below, thus causing an efficient single stage separation before the liquid enters the collecting channel. The specific gravity at each separation element in the vertical column is significant in establishing the predetermined number and predetermined cross sectional area of each of the filtering apertures.

The features of novelty which characterize this invention are pointed out with particularity in the annexed claims. The invention itself, however, both as to its organization and method of operation, together with further objects and advantages will best be understood by reference to the following detailed description of the invention and brief description of the drawings.

BRIEF DESCRIPTION OF THE DRAWINGS

FIG. 1 is a perspective view of the clarifier of the present invention having a broken away portion;

FIG. 2 is an end view of FIG. 1;

FIG. 3 is a side view of FIG. 1;

FIG. 4 is an exploded side view of one form of separation elements shown in a portion of FIG. 2;

FIG. 5 is a perspective view of one separation element shown in FIG. 4; and,

FIG. 6 is a side view of an alternative arrangement of separation elements that may be employed in the present invention.

DETAILED DESCRIPTION OF THE INVENTION

Referring now to FIG. 1, a clarifier generally referenced as 10 for separating a substance of a heavier density from a liquid having a lesser density is illustrated. The clarifier includes a tank or a vessel 12, and the vessel includes a separation portion 14, a weir portion 16 located above the separation 14 and a sump portion 18 located below the separation portion 14. Within the interior of the vessel 12 in the separation portion 14 there are a plurality of separation elements, a few separation elements being individually designated 20 and shown in the broken away portion of FIG. 1. Means for retaining the separation elements, such as small cylindrical extensions 36 protruding a slight distance inward from the walls of the separation portion 14 of the vessel 12 described more fully in conjunction with FIGS. 3 and 4, are provided for retaining the separation elements within the separation portion 14. In FIG. 1, the means for retaining the separation elements are arranged such that at least one pair of vertical columns of separation elements are provided within the separation portion 14. One pair of vertical columns are shown in the broken away portion. Each pair of vertical columns is arranged to provide a generally vertically extending collecting channel 22 from the bottom to the top of the separation portion 14. Although the arrangement of each pair of vertical columns of separation elements and the collecting channel will be described more fully in conjunction with subsequent Figures, it should be generally understood that the clarified liquid of lesser density will rise upward through the collecting channel 22. Atop each vertical column of separation elements is an upward extending wall element 24, a few of which are referenced in FIG. 1. Each wall element has a V-shaped notch formed therein and centered, and capping plates 25 fit in each leg of the V-shaped notch. The wall elements 24 and capping plates 25 above each pair of vertical columns form a fluid flow path for the clarified liquid of lesser density rising through the collecting channel 22 to the weir portion 16 of the clarifier 10. The capping plates 25 in the V-shaped notches of the wall elements 24 prevent the entry of the unclarified mixture of the substance of heavier density and the liquid from distribution pipe 32 into the fluid flow path of the clarified liquid from the collecting channel 22. Apertures 26 allow the clarified liquid to flow from the flow paths of the pairs of wall elements 24 and capping plates 25 into the weir portion 16. Drain outlets 28 are provided to remove the clarified liquid from the weir portion 16. An inlet 30 is connected to a distribution pipe 32 which distributes the incoming mixture of liquid of lesser density and the substance of heavier density near the top of separation portion of the clarifier. Distribution apertures in the distribution pipe 32 are positioned below the normal liquid level to prevent frothing and are positioned to distribute the incoming mixture between adjacent pairs of vertical columns of separation elements so that the clarified liquid flowing up the collecting channel 22 and through the fluid flow path formed by wall elements 24 and capping plates 25 is separate from the incoming mixture. The arrangement of the apertures in the distribution pipe is seen more clearly in FIG. 2.

As will be described more fully in conjunction with the description of operation of the clarifier 10, the substance of heavier density flows downward and collects in the sump portion 18. The sump portion 18 includes walls sloping inward at a predetermined angle to facilitate collection of the substance of heavier density at the bottom of the sump portion. The predetermined angle of the walls is determined according to the characteristics of the substance of heavier density and its ability to settle downward. At the bottom of the sump portion 18 an outlet valve 34 is provided as a means for removing the substance of heavier density. It may be advantageous to add an air or liquid valve to the outlet valve 34 for introducing blasts of air or liquid to loosen the substance of heavier density and facilitate its removal.

Referring now to FIG. 2 where the same reference numerals are used to reference the same elements, as is the case with the remainder of the Figures, two pairs of vertical columns of separation elements 20 are shown exposed in the broken away portion. Each pair of separation elements illustrates the collecting channel 22 extending through the separation portion 14 of the clarifier 10. The wall elements 24 and capping plates 25 also illustrate the fluid flow path between the collecting channel 22 and the weir portion 16, the fluid flow path being formed through the apertures 26. The inlet 30 and distribution pipe 32 are illustrated, and formed within the distribution pipe 32 are a plurality of distribution apertures 32a. The apertures 32a are placed between adjacent pairs of columns of separation elements so that the mixture of the liquid and the substance of heavier density is separated from the fluid flow path between pairs of wall elements 24 and capping plates 25 and the vertical collecting channel 22. Thus, the inlet 30, distribution pipe 32 and the apertures 32a in the distribution pipe form a means for introducing the mixture below the normal liquid level near the top of the separation portion of the vessel and separating that introduced mixture from the collecting channel and clarified liquid flow path of each pair of vertical columns of separation elements.

FIG. 3 illustrates in the broken away portion the transverse extension of the separation elements 20 across the separation portion 14 of the vessel 12. Each separation element fits snugly between the walls of the vessel 12 but not so snugly as to prevent easy removal of the elements for cleaning purposes. The means for retaining the separation elements in the separation portion 14 may comprise small cylindrical or tubular extensions 36 connected securely to the walls of the separation portion. Each separation element sits on or is retained by two extensions 36, one extension protruding inward at each longitudinal end of the separation element. These extensions may be welded to the walls of the separation portion. The extensions 36 protrude only slightly in the longitudinal or transverse direction of the separation elements so as not to interfere with the separation action of each separation element by blocking its separation apertures.

Also illustrated in FIG. 3 are the wall elements 24 extending across the separation portion 14. The wall elements 24 rise a sufficient distance above the separation elements 20 so as to provide fluid flow paths from the collecting channels through the apertures 26 to the weir portion 16. The V-shaped notch in each wall element beneath the distribution pipe 32 allows the distribution pipe to fit through the clarifier and distribute the incoming mixture below the normal liquid level 37 in vessel 12 in the previously described manner. The capping plates 25 prevent the incoming mixture from entering the clarified liquid flow path between the wall elements 24 because the incoming mixture is regulated not to rise above the uppermost extremity of the wall elements or capping plates. The wall elements and capping plates are removably retained in a suitable manner in the separation portion.

FIGS. 4 and 5 illustrate one form of the separation elements used in the present invention. In FIG. 4, a number of the separation elements 20 are illustrated showing a segment of one pair of vertical columns with the collecting channel 22 intermediate the pair. Each separation element 20 has a generally vertically downward extending wing 38 and a downward and outward jutting wing 40, both having a generally rectangular shape. The vertically downward wing 38 may include a lip portion 42 for adjoining the lower vertically adjacent separation element in the vertical column. The vertical downward extending wing 38 and the downward and outward jutting wing 40 join at a predetermined angle $\alpha$ at an apex referenced generally at 44. The predetermined angle at which the two wings 38 and 40 join is determined primarily by the characteristics of the substance of heavier density as will be described more fully subsequently. Arranged in this manner, each pair of vertical columns of separation elements gives the suggestion of a chevron with the collecting channel passing through the points of the chevrons. Now also referring to FIG. 5, each separation element 20 also has a predetermined number of separation apertures 46 formed preferably in the vertically downward extending wing near the apex. Each of the separation apertures 46, which may be circular as illustrated in FIG. 5 or of other particular design, has a predetermined cross sectional area. By varying the number of separation apertures 46 and the cross sectional area of each aperture, a certain amount of liquid flow through each separation element results. The considerations in determining these factors will be described subsequently.

Referring now to FIGS. 2 and 4, by placing the tubular extensions 36 at a predetermined distance apart in vertical columns, the separation elements may be stacked from the bottom to the top of the separation portion merely by sliding each separation element over its two retaining tubular extensions 36. The bottommost separation elements 20 in each pair of vertical columns are retained against a stop or projection (not shown) so as to begin the vertical column. Each pair of vertical columns of separation elements is arranged as a result of the position of the tubular extensions 36 so that the vertically adjacent and contacting downwardly extending wings of the separation elements of one vertical column faces the similar adjacent and contacting downward extending wings of the separation elements of the other column of the pair, thereby forming the collecting channel 22 therebetween. The lip 42 connected to each downward extending wing 38 allows the separation element to rest snugly against each lower adjacent separation element to build the column from the bottom to the top. The lip 42 restricts any fluid flow between that lip 42 and the downward and outward jutting wing 40 of the immediately adjacent lower separation element. By arranging the separation elements and the means for retaining the separation elements in the manner described, each of the separation elements may easily be removed from the clarifier and cleaned if necessary. This is particularly important in many applications in which the substance of heavier density may tend to collect on the separation elements and restrict or otherwise hamper the clarifying action. This ready accessibility for easy cleaning provides advantages heretofore unavailable in clarifiers of other designs. As is equally apparent from the foregoing description, the vessel 12, the separation elements 20, and the means 36 for retaining the separation elements are relatively simple in design may be economically constructed to provide a simple, low-cost clarifier 10.

An alternative form of the separation elements which may be used in the present invention is shown in FIG. 6. In this embodiment all of the separation elements 20 of one vertical column are formed as a unitary structure by welding or directly attaching each downward and outward jutting wing 40 directly to a single sheet or unitary portion 38a. The separation apertures 46 may then be formed in the portion 38a. Downward portion 38a merely substitutes for downward wings 38 in the previously described vertical columns. The angle of attachment and the predetermined number and cross sectional areas of the separation apertures in FIG. 6 are determined by and correspond to the description relating to FIGS. 4 and 5. The unitary structure of the vertical column of separation elements shown in FIG. 6 may be retained in the separation portion 14 by the cylindrical extensions 36 previously described, for example, but it may not be necessary to employ two cylindrical extensions 36 to retain each separation element 20 since only a few such extensions could retain the whole unitary structure. In this arrangement the separation elements are equally as accessible for cleaning. Each unitary vertical column of separation elements may be removed from the clarifier as a unit and cleaned. This alternative arrangement is also simple in design and may be economically constructed.

The operation of the clarifier of the present invention will now be described in conjunction with FIG. 4. The mixture of the substance of heavier density and the liquid is introduced in the clarifier through the inlet and distribution pipe and is caused to flow between the pairs of vertical columns as is illustrated by flow path A. Gravity working upon the substance of heavier density in the flow path A causes particles of the substance of heavier density to settle downward. This separates the liquid having the lesser density and because its specific gravity is less, it tends to float upward. Since the liquid of lesser density is moving upward because of its decrease specific gravity due to settling of the particles, a flow path B of liquid of lesser density results. The number of separation apertures and the predetermined cross sectional area of each separation aperture determine the amount of fluid flow through each separation element in path B which will be allowed. The fluid flow in path B is thus restricted and regulated to be slow enough so that more particles of the substance of heavier density will continue settling from flow path B, and only the clarified liquid of lesser density will flow from the separation apertures 46 into the collection channel 22 and upward as is illustrated by the flow path C. The particles of heavier density settling from the liquid in flow path B settle downward on the upward surfaces of the downward and outward jutting wings 40, and from there, slide downward off the edge of wings 40 to settle to the sump portion of the clarifier. Thus the flow of clarified liquid from the separation apertures 46 is separated from the settling path of the particles of heavier density thereby avoiding turbulence or remixing of these two substances. Due to the separate paths for the liquid and the substance of heavier density only single stage separation or clarification, as provided by each separation element 20, is required. The rectangular nature of each of the wings of the separation elements and the predetermined number and cross sectional areas of each of the separation apertures, provides a uniform cross section in the direction of fluid flow as shown by flow path B through each separation element. This factor assures uniform velocity and laminar flow throughout the clarifier and results in very efficient separation at minimal retention time. The relatively large number of separation elements each having a flow path represented by B provides a large settling surface, resulting in highly efficient separation within the retention time.

The amount of laminar and steady flow of clarified liquid from each individual separation element 20 may depend upon each particular separation element's position in the vertical column. As the particles of the substance of heavier density settle further downward toward the bottom of the separation portion 14, the specific gravity near the bottom is much higher than that at the top. This establishes a specific gravity gradient from the top to the bottom with the top being of lesser specific gravity. Because of the concentration of a greater amount of substance of heavier density near the bottom, a slower separation or clarification must be effected by the bottom separation elements so that the clarified liquid flowing in the collection channel 22 is equally as free of the substance of heavier density at the bottom of the collection channel as it is at the top. For this reason, the predetermined number of separation apertures and the cross sectional area of each of the separation apertures may be varied from top to bottom, so as to generally produce a lesser flow of clarified liquid near the bottom of each pair of vertical columns of separation elements.

The determination of the number of separation apertures and the cross sectional area of each of the separation apertures may be done experimentally or may be calculated if the characteristics of the substance of heavier density and the liquid of lesser density, the desired clarity of the liquid of lesser density, and the volumetric flow liquid and substance of heavier density, for example, are known or can be determined. The predetermined number and cross sectional areas of the separation apertures may be varied to achieve a desired clarity of liquid by increasing the number or area of separation apertures when less clarity is desired or by decreasing the number or area when more clarity is required.

It should also be understood that by varying the number and cross sectional area of the separation apertures a particular density of substance may be removed at the sump portion. Employed in this manner the clarifier's use is primarily directed toward achieving a particular density of suspension at the sump portion rather than providing a desired clarity of liquid at the weir portion. Of course in either application, the predetermined factors may be varied depending on the size of particles of the substance of heavier density.

The predetermined angle at which the vertically downward extending wing 38 and the downward and outward jutting wing 40 of each filter element 20 join at the apex, referenced $\alpha$ in FIG. 4, must be great enough such that particles of the substance of heavier density will readily slide off of the downward and outward jutting wings of each separation element. This requirement necessarily depends on the nature of the substance of heavier density, and the angle $\alpha$ may be determined experimentally for a particular substance. An angle $\alpha$ of 30° has been found to be satisfactory in most applications.

After determining or setting angle $\alpha$, the number and cross sectional areas of the separation elements may be determined. The number and cross sectional areas of the separation apertures in each particular separation element determine the volumetric flow V through that particular separation element. It is also necessary that the volumetric flow V not be so great as to cause a particle of the substance of heavier density, for example particle 48, to be dragged upward along the fluid flow path B. To achieve this requirement, it is necessary to determine the downward settling velocity $V_t$ of the particle 48 at a particular height in the separation portion 14 of the clarifier. Because $V_t$ varies according to height, as previously explained due to the gradient of specific gravity from top to bottom, it may be necessary to experimentally determine this quantity for particular substances of heavier density. $V_t$ has some proportionality to the rate at which the substance of heavier density is removed from the outlet valve 34. After $V_t$ has been determined, the total volumetric flow clarified liquid from a particular separation element should conform to the relationship:

$$V \leq V_t \cdot \cos \alpha$$

By causing the flow V to conform to the relationship just described, there is no chance that any particular particle 48 of the substance of heavier density will be propelled in the flow path B and transported through the separation apertures to the collecting channel 22.

From the foregoing description of operation and description of elements of the present clarifier, it can be seen that each separation element provides a uniform cross section to the fluid flow path and assures a uniform velocity and laminar flow of clarified liquid through its separation apertures. The high number of separation elements which may be retained within the clarifier using the teachings of the present invention provides a large settling surface. Furthermore, the compact arrangement of the separation elements provides a clarifier which has relatively small volume for the quantity of clarified liquid it produces. The design of the separation elements is such that virtually at all points prior to the entry of the liquid of lesser density into the collecting channel, the substance of heavier density may settle out providing highly efficient separation. Furthermore, the separation elements are arranged such that the substance of heavier density will always slide downward toward the sump portion of the clarifier. Each separation element insures that the substance of heavier density as it is settling downward never interferes with the flow of clarified liquid of lesser density, which reduces turbulence, insures a laminar flow, and provides a high degree of separation or clarification.

Although a single embodiment of the clarifier of the present invention has been shown and described, it should be recognized that the rudiments of the basic invention have been described to the fullest extent possible for the general application of the clarifier of the present invention to a wide variety of uses. The various volumes of fluid flow here-described and the angles and cross sectional areas and numbers of separation elements all depend upon the particular characteristics of the substance of heavier density and the liquid of lesser density and other factors for which the clarifier may be employed. It may be that those skilled in the art may perceive changes and modifications without departing from the teachings of the present invention. For example it is contemplated that the teachings of the present invention may be employed in batch-type clarifiers instead of the continuous flow clarifier described. Therefore, it is intended by the appended claims to cover all such changes and modifications as fall within the true spirit and scope of this invention.

What is claimed is:

1. A clarifier for separating a substance of heavier density from a liquid having a lesser density comprising:

a vessel having a separation portion and an upper weir portion;

a plurality of pairs of separation elements positioned in the separation portion in vertically stacked opposed parallel relation to define a common up flow channel therebetween and a down flow path exteriorly thereof, each having a substantially uniform cross section in the direction of liquid flow, each separation element having a vertical downward extending wing and a downward and outward jutting wing, the vertically downward wing and the downward and outward wing being joined at a predetermined angle $\alpha$ at an apex, and each separation element further having a predetermined number of fluid flow apertures of predetermined cross sectional areas formed in the vertically downward wing adjacent the apex; and, retaining means retaining the separation elements in at least one pair of vertical columns within the separation portion of the vessel with the downward extending wings of each separation element being in near vertical alignment with the downward extending wing of each vertically adjacent separation element of the column, said means further retaining said elements with the adjacent downward extending wings of the separation elements in one column facing in opposed substantial parallel relation to the similar adjacent downward extending wings of the separation elements of the other column of the pair to define a vertical up flow collecting channel extending through the separation portion and communicating with the upper weir portion of the vessel;

whereby the heavier density substance is caused by gravity to settle along the downward and outward jutting wings of the separation elements and the liquid is caused by a decrease in specific gravity due to settling of the heavier density substance to flow upward and inward through the fluid flow apertures to the up flow collecting channel to provide clarified liquid of lesser density at the weir portion of the vessel.

2. The clarifier as recited in claim 1 wherein the apex angle $\alpha$ of each separation element conforms to the relationship:

$$V \leq V_t \cdot \cos \alpha$$

where $V_t$ is the settling velocity of the substance of heavier density, and $V$ is the velocity of up flow through the separation element as a function of the predetermined number of separation apertures of predetermined cross sectional area.

3. The clarifier as recited in claim 1 wherein the vessel further includes a sump portion below the separation portion.

4. The clarifier as recited in claim 3 wherein the sump portion includes a means for removing the substance of heavier density.

5. The clarifier as recited in claim 1 wherein the vertical downward wing and the downward and outward jutting wing each are generally rectangular in shape.

6. The clarifier as recited in claim 1 wherein there are provided a plurality of pairs of vertical columns.

7. The clarifier as recited in claim 1 further including inlet means for introducing the mixture of the liquid of lesser density and the substance of greater density into the vessel, said inlet means for introducing the mixture being positioned near the top of the separation portion of the vessel and adapted to discharge the mixture into the vessel exteriorly of the collecting channel of each pair of vertical columns of separation elements and further positioned to introduce the mixture below the normal liquid level in the vessel.

8. The clarifier as recited in claim 1 wherein a fluid flow path is provided for the clarified liquid of lesser density between the top of the collecting channel and the weir portion of the vessel.

9. The clarifier as recited in claim 1 wherein the vertical downward extending portions of the separation elements in the vertical column are formed as a unitary member.

10. The clarifier of claim 1 wherein the vertically downward extending wing portions of the separation elements terminate at their upper end within the weir portion with the side walls thereof having a transverse V-shaped cut therein and liquid tight cover means covering the top of the up flow channel and the V-shaped cut therein to avoid mixing of the incoming unclarified liquid and the clarified liquid.

11. The clarifier of claim 10 wherein means for supplying liquid to be clarified is positioned to discharge unclarified liquid into the separation portion above the liquid tight cover means covering the top of the up flow channel and below the normal liquid level of the liquid in the vessel.

12. The clarifier of claim 1 wherein the separation elements are of elongate configuration to extend from one side of the separation portion of the vessel to the other and the retaining means comprises stub means received within the apex of angle $\alpha$ at each end of a separation element with gravitational force causing the separation element to engage the retaining means and a separation element being rotatably engaged by the separation element immediately above.

* * * * *